Sept. 7, 1926.
M. SKOLNIK
1,599,253
APPARATUS AND PROCESS FOR MAKING ARTIFICIAL CONSTRUCTION MATERIAL
Filed Sept. 11, 1925   3 Sheets-Sheet 1

Inventor
Max. Skolnik
By Whiteley and Ruckman
his Attorneys.

Sept. 7, 1926.                                                              1,599,253
M. SKOLNIK
APPARATUS AND PROCESS FOR MAKING ARTIFICIAL CONSTRUCTION MATERIAL
Filed Sept. 11, 1925    3 Sheets-Sheet 2

Inventor:
Max Skolnik.
By Whiteley and Ruckman
his Attorneys

Sept. 7, 1926.
M. SKOLNIK
1,599,253
APPARATUS AND PROCESS FOR MAKING ARTIFICIAL CONSTRUCTION MATERIAL
Filed Sept. 11, 1925   3 Sheets-Sheet 3
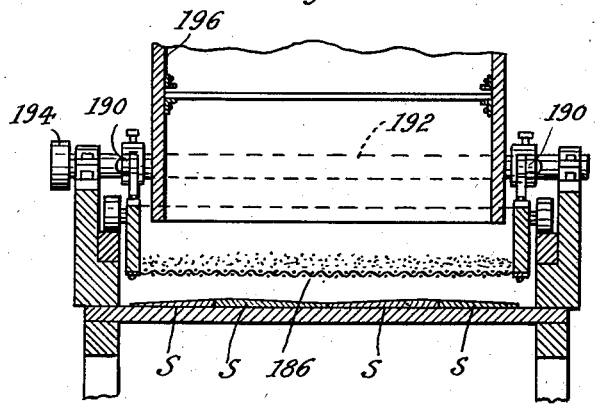
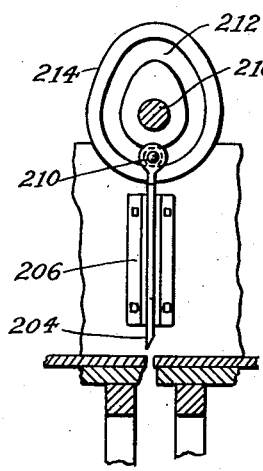
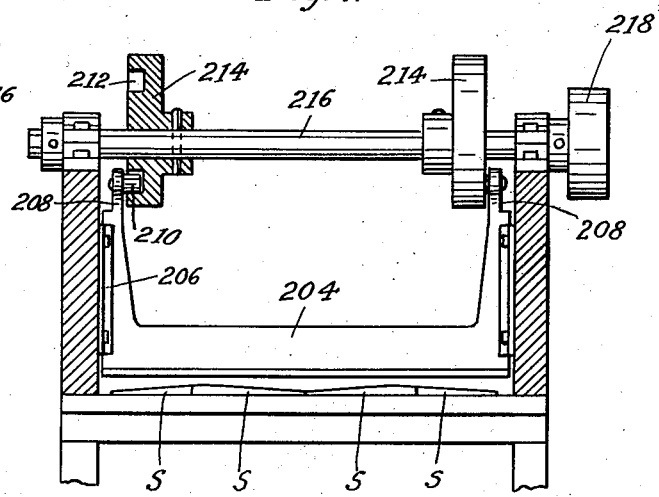
Inventor:
Max Skolnik.
By Whiteley and Ruckman
his Attorneys.

Patented Sept. 7, 1926.

1,599,253

UNITED STATES PATENT OFFICE.

MAX SKOLNIK, OF MINNEAPOLIS, MINNESOTA, ASSIGNOR TO PATENTED PRODUCTS CORPORATION, OF GARY, INDIANA.

APPARATUS AND PROCESS FOR MAKING ARTIFICIAL CONSTRUCTION MATERIAL.

Application filed September 11, 1925. Serial No. 55,681.

My invention relates to apparatus and process for making artificial construction material. The construction material which I have in mind includes shingles, floor coverings, box-board and wall-board, and while the apparatus which I have shown for illustrative purposes is arranged particularly for the manufacture of shingles, it will be understood that only minor changes are required to adapt it for manufacturing other articles. I employ cornstalks or similar stalks as the raw material from which the finished products are produced, the cornstalks being reduced to a pulp which is compressed into sheet form and cut to the desired shape and size. The cornstalks may be reduced in any suitable manner, such for instance as that disclosed in my prior applications Serial Number 524,764 filed December 24, 1921, now Patent 1,556,641, Oct. 13, 1925 and Serial Number 693,523, filed February 18, 1924. A specific object of the present invention is to provide an apparatus and a process by means of which cornstalks or similar stalks are subjected to treatment whereby their fibers become incorporated and interengaged in the finished product to cause such product to have great strength and durability, and into or through which nails may be driven without likelihood of splitting the article.

The full objects and advantages of my invention will appear in connection with the detailed description thereof, and the novel features embodied in my inventive idea will be particularly pointed out in the claims.

In the accompanying drawings, which illustrate one form in which my invention may be embodied,—

Figure 1:
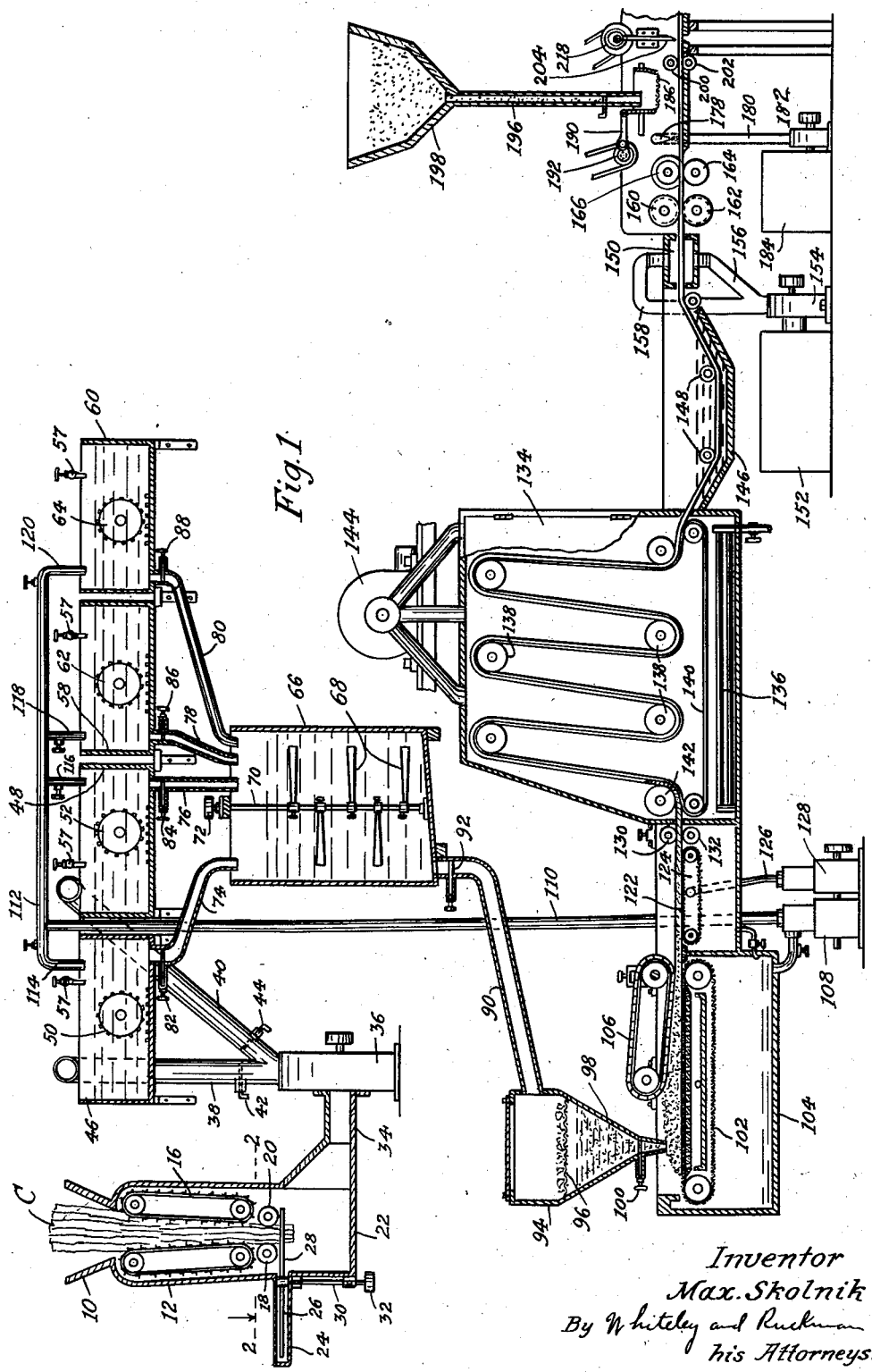
Figure 2:
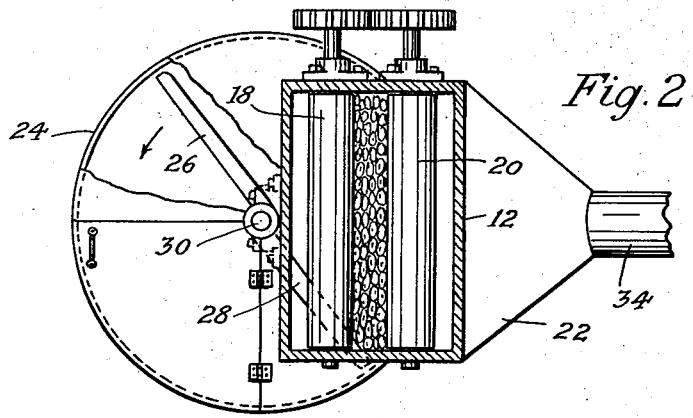
Figure 3:
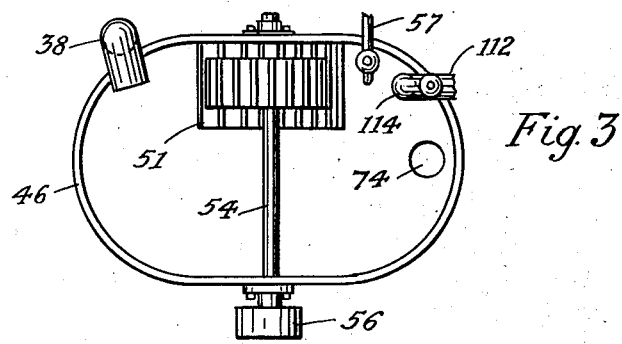
Figure 4:
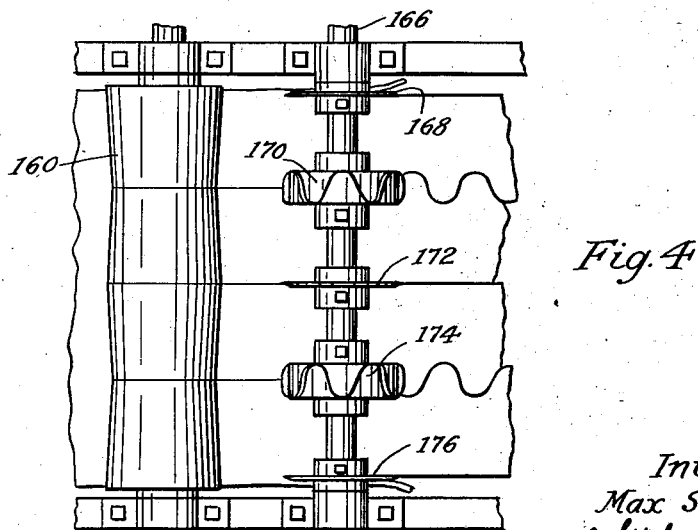

Fig. 1 is a side elevational part sectional view of the apparatus. Fig. 2 is a view in horizontal section on the line 2—2 of Fig. 1. Fig. 3 is a top view of one of the beating tanks. Fig. 4 is a fragmentary view having a roller and cutters shown in plan. Fig. 5 is a vertical sectional view of a screening device. Fig. 6 is a fragmentary view showing a cutter. Fig. 7 is a view at right angles to Fig. 6.

Referring to the construction shown in the drawings, the numeral 10 designates a hopper for receiving corn or other stalks C. Joined with the bottom of the hopper is a casing 12 which contains a pair of endless conveyors 14 and 16 and a pair of rollers 18 and 20 between which the stalks pass for downward feeding movement. Joined with the lower end of the casing 12 is a receptacle 22, the junction between this receptacle and the casing 12 being extended at one side to form a casing 24 for a pair of rotating knives 26 and 28 which cut the stalks into short pieces. These knives are secured to a vertical shaft 30 having a driving pulley 32 secured to its lower end. From the receptacle 22 a pipe 34 leads into a blower casing 36 containing any well-known form of blower. From the periphery of the blower case 36, two pipes 38 and 40, having shut-off slides 42 and 44, lead respectively to two beating tanks 46 and 48 containing beaters 50 and 52 of any suitable or well-known construction and driven by shafts 54 to which pulleys 56 are secured as shown in Fig. 3. The two tanks 46 and 48 are alike and are arranged in alinement in the embodiment shown with two similar tanks 58 and 60 for receiving additional raw material, such as rags, and containing beaters 62 and 64. The tanks 58 and 60 are intended to be used only when a soft pliable product is desired. By increasing the amount of rag pulp, the product will be rendered more pliable, while if it is not desired to produce a pliable product, the use of the tanks 58 and 60 may be omitted. I have found that twenty-five pounds of rag pulp in connection with one hundred pounds of cornstalk pulp will produce a very soft pliable product. Water may be introduced into the tanks as desired through pipes 57 and the proper amount of an alkali, such as potassium carbonate is added to the tanks to reduce the raw material to a pulp. For instance one pound of the alkali may be employed for each fifty pounds of cornstalks. When quicker action is desired, the amount of alkali will be increased. Below the series of tanks just referred to is a mixing receptacle 66 within which rotate mixing blades 68 secured to a shaft 70 on the upper end of which is a driving pulley 72. The four tanks 46, 48, 58 and 60 are connected, respectively, with the mixing receptacle 66 by pipes 74, 76, 78 and 80, having shut-off valves 82, 84, 86 and 88, whereby the two tanks 46 and 48 may be drawn from alternately and the two tanks 58 and 60 may also be drawn from alternately.

From the bottom of the mixing receptacle 66 a pipe 90, having a shut-off valve 92 delivers into a hopper 94 containing a sieve 96 for sifting out any large pieces which have not been reduced. The bottom of the hopper 94 terminates in a spout 98, having a shut-off valve 100. The spout 98 delivers the reduced pulp upon an endless screen 102 positioned in the upper part of a receptacle 104. Cooperating with the screen 102 is an inclined belt 106 which serves to partly compress the material. Connected with the receptacle 104 is a pump 108 which takes therefrom the liquid which runs out of the pulp and delivers it through a vertical pipe 110 into a horizontal pipe 112 having branches 114, 116, 118 and 120 controlled by shut-off valves and which deliver respectively into the four beating tanks. In alinement with the endless screen 102 is a second endless screen 122 underneath which is a casing 124 connected by a pipe 126 with a vacuum pump 128 which takes out a considerable of the remaining moisture. Beyond the endless screen 122 are two compression rollers 130 and 132 which still further compress the pulp into sheet form. It is desirable at this time to subject the sheet material to a drying operation. As a suitable means for accomplishing this object, I have shown a drying chamber 134 having steam coils 136 in the bottom thereof. Above the steam coils in the chamber 134 are a number of rollers 138 around which an endless belt 140 passes back and forth. A roller 142 serves to press the material onto the belt 140. The action of the steam coils in drying the material is increased by a fan 144 mounted above the chamber 134 and delivering air thereinto. After passing out of the drying chamber, the sheet material is passed through asphaltum contained in a vat 146, the material being held under the surface of the asphaltum by rollers 148. From the asphaltum bath, the material is passed through a chamber 150 where it is dusted in the following manner. Powdered material such as a mixture of cement and soapstone is contained in a receptacle 152 from which it is taken by a blower 154 and delivered by pipes 156 and 158 into the lower and upper portions of the chamber so that the sheet material is dusted on both sides. From the chamber 150 the material passes between the pair of rollers 160 and 162, the latter being cylindrical and the roller 160 having the shape shown in Fig. 4 with four inclined annular surfaces so that the material is pressed into shape for forming four shingles transversely as indicated in Fig. 5 by the letter S with each shingle thicker at one end than at the other. The material then passes between a lower roller 164 and a shaft 166 which carries five cutters 168, 170, 172, 174 and 176. The cutters 168 and 176 are disc cutters and trim the margins of the material so as to form the shingles of the proper length. The cutter 172 is also a disc cutter and serves to cut the sheet material longitudinally along its central line. The cutters 170 and 174 have corrugated cutting edges so that the thick or weather ends of the shingles will be corrugated, as is evident from Fig. 4. After being cut longitudinally in this manner, the sheet material passes under a spraying nozzle 178 to which an adhesive is delivered through a pipe 180 by means of a pump 182 connected with a supply tank 184. Beyond the nozzle 178 is a wire sieve 186 having a frame 188 to which rocking arms 190 are attached, these arms being rocked by a shaft 192 to which a driving pulley 194 is secured. A chute 196 connects with a hopper 198 to deliver sand or pulverized rock to the sieve 186 which is shook by the arms 190. The sheet material passes between rollers 200 and 202, the upper roller 200 pressing into the material, the sand or pulverized rock which has been distributed thereon. The material then passes underneath a reciprocating cutter 204 which cuts it transversely to the desired size. As shown in Figs. 6 and 7, this cutter is guided for reciprocation by guides 206, and it has arm members 208 at its two ends which carry rollers 210 working in cam grooves 212 formed in cam discs 214 secured to a shaft 216 to which a driving pulley 218 is secured.

The operation and advantages of my invention will be readily understood in connection with the foregoing description. Cornstalks or similar stalks are fed into the hopper 10. The conveyors 14 and 16 and the rollers 18 and 20 feed the stalks, while the cutters 26 and 28 cut them into short lengths, preferably of about one inch. The blower in the casing 36 forces the stalks into one of the tanks 46 and 48, it being understood that reduced pulp may at this time be drawn from the other tank and that when it is desired to add rag pulp, this latter may be supplied from one of the tanks 58 and 60. The pulp is thoroughly mixed in the mixing receptacle 66, from which it is delivered for further treatment according to the character of the product which is to be manufactured. As previously described, the subsequent operations include drying, treatment with a bath of asphaltum, dusting both sides of the sheet with a mixture of powdered cement and soapstone, pressing the sheet into shape to form four shingles lying side by side transversely, cutting and trimming the sheets to produce four longitudinal rows of shingles, passing the material under a nozzle which sprays an adhesive on its upper surface, supplying sand or pulverized rock to the upper surface, passing the sheet material between rollers which presses in the last-mentioned coating, and finally cutting the longitudinal strips transversely to produce the finished article. It will be understood that for articles other than shingles, some of the above steps may be omitted or varied according to the character of the article to be produced. For instance, in place of a bath of asphaltum, a bath of resin and wax may be employed. Also the shaping may be varied as desired.

I claim:—

1. Apparatus for making artificial construction material comprising means for cutting cornstalks and similar stalks into pieces, a tank in which the cut-up stalks are reduced to a pulp, means for conveying the cut-up stalks from said cutting means to said tank, an endless screen upon which the pulp is delivered to form a sheet, a receptacle containing waterproofing material, means for causing said sheet to travel underneath the surface of the waterproofing material, and mechanism for cutting said sheet.

2. Apparatus for making artificial construction material comprising means for cutting cornstalks and similar stalks into pieces, a receptacle for receiving said pieces, a blower, connected with said receptacle, a pipe leading from said blower, a tank with which said pipe is connected and in which the cut-up stalks are reduced to a pulp, an endless screen upon which the pulp is delivered to form a sheet, a receptacle containing waterproofing material, means for causing said sheet to travel underneath the surface of the waterproofing material, and mechanism for cutting said sheets.

3. Apparatus for making artificial construction material comprising means for cutting cornstalks and similar stalks into pieces, a receptacle for receiving said pieces, a blower connected with said receptacle, a pipe leading from said blower, a tank with which said pipe is connected and in which the cut-up stalks are reduced to a pulp, an endless screen upon which the pulp is delivered to form a sheet, a receptacle containing waterproofing material, means for causing said sheet to travel underneath the surface of the waterproofing material, means for applying powdered material to said sheet, rollers for pressing said sheet into shape, a device for spraying an adhesive upon said sheet, a device for applying sand to said sheet, and mechanism for cutting said sheet.

4. Apparatus for making artificial construction material comprising means for cutting cornstalks and similar stalks into pieces, a receptacle for receiving said pieces, a blower connected with said receptacle, a pipe leading from said blower, a tank with which said pipe is connected and in which the cut-up stalks are reduced to a pulp, an endless screen upon which the pulp is delivered to form a sheet, a drier through which said sheet passes, a receptacle containing waterproofing material, means for causing said sheet to travel underneath the surface of the waterproofing material, a receptacle for powdered material, a blower connected with said receptacle and delivering upon said sheet, rollers for pressing said sheet into shape, means for cutting said sheet longitudinally into strips, a device for spraying an adhesive upon the upper surface of said sheet, a device for applying the sand to the adhesive coated sheet, and means for cutting said sheet transversely.

5. Apparatus for making artificial construction material comprising means for cutting cornstalks and similar stalks into pieces, a tank in which the cut-up stalks are reduced to a pulp, means for conveying the cut-up stalks from said cutting means to said tank, an endless screen upon which the pulp is delivered to form a sheet, a receptacle containing waterproofing material, means for causing said sheet to travel underneath the surface of the waterproofing material, means for pressing said sheet to form a plurality of rows of shingles which are thicker at one end than at the other, means for cutting said rows from each other longitudinally of the sheet to form strips, and means for cutting said strips transversely to form separate shingles.

6. Apparatus for making artificial construction material comprising means for cutting cornstalks and similar stalks into pieces, two tanks in which the cut-up stalks are reduced to a pulp, means for conveying the cut-up stalks into one of said tanks at a time, two tanks in which other fibrous material is reduced to a pulp, a mixer, pipes connecting said four tanks respectively with said mixer, shut-off devices in said pipes, an endless screen upon which pulp from said mixer is delivered to form a sheet, a receptacle containing waterproofing material, means for causing said sheet to travel underneath the surface of the waterproofing material, and means for cutting said sheet.

7. Apparatus for making artificial construction material comprising a hopper for receiving cornstalks and similar stalks, a pair of endless conveyors and a pair of rollers in said hopper between which the stalks travel, mechanism adjacent said rollers for cutting said stalks into pieces, a receptacle for receiving said pieces, a blower connected with said receptacle, two pipes leading from said blower, shut-off devices in said pipes, two tanks with which said pipes are respectively connected and in which the cut-up stalks are reduced to a pulp, an endless screen upon which the pulp is delivered, a receptacle underneath said endless screen, a pump connected with said receptacle for taking liquid therefrom and delivering it to said tanks, an inclined belt traveling above said endless screen for pressing the pulp thereon into sheet form, a second screen beyond said first mentioned endless screen, a casing for said second screen, a vacuum pump connected with said casing, a drier for said sheet material beyond said second screen, a receptacle containing waterproofing material, means for causing said sheet material to travel underneath the surface of the water-proofing material, a receptacle for powdered material, a blower connected with said receptacle and delivering upon said sheet material, rollers for pressing said sheet material into shape, means for cutting said sheet material longitudinally into strips, a device for spraying an adhesive upon the upper surface of said sheet material, a device for applying sand to the adhesive covered surface, a roller engaging the sanded surface, and means for cutting said sheet material transversely.

8. Apparatus for making artificial construction material comprising a hopper for receiving cornstalks and similar stalks, a pair of endless conveyors and a pair of rollers in said hopper between which the stalks travel, mechanism adjacent said rollers for cutting said stalks into pieces, a receptacle for receiving said pieces, a blower connected with said receptacle, two pipes leading from said blower, shut-off devices in said pipes, two tanks with which said pipes are respectively connected and in which the cut-up stalks are reduced to a pulp, two tanks in which other fibrous material is reduced to a pulp, a mixer, pipes connecting said four tanks respectively with said mixer, shut-off devices in said pipes, an endless screen upon which the pulp from said mixer is delivered, a receptacle underneath said endless screen, a pump connected with said receptacle for taking liquid therefrom and delivering it to said tanks, an inclined belt traveling above said endless screen for pressing the pulp thereon into sheet form, a second endless screen beyond said first-mentioned endless screen, a casing for said second screen, a vacuum pump connected with said casing, a drier for said sheet material beyond said second screen, a receptacle containing waterproofing material, means for causing said sheet material to travel underneath the surface of the water-cooling material, a receptacle for powdered material, a blower connected with said receptacle and delivering upon said sheet material, rollers for pressing said sheet material into shape, means for cutting said sheet material longitudinally into strips, a device for spraying an adhesive upon the upper surface of said sheet material, a device for applying sand to the adhesive covered surface, a roller for engaging the sanded surface, and means for cutting said sheet material transversely.

9. The process of making artificial construction material which consists in cutting cornstalks and similar stalks into pieces, reducing said pieces to a pulp with a chemical agent, pressing the pulp into a sheet, and subjecting the sheet to a bath of waterproofing material.

10. The process of making artificial construction material which consists in cutting cornstalks and similar stalks into pieces, reducing said pieces to a pulp with a chemical agent, pressing the pulp into a sheet, subjecting the sheet to a bath of waterproofing material, and cutting the sheet.

11. The process of making artificial construction material which consists in cutting cornstalks and similar stalks into pieces, reducing said pieces to a pulp with a chemical agent, pressing the pulp into a sheet, drying said sheet, subjecting the sheet to a bath of waterproofing material, and cutting the sheet.

12. The process of making artificial construction material which consists in cutting cornstalks and similar stalks into pieces, reducing said pieces to a pulp with an alkali, pressing the pulp into a sheet, drying said sheet, subjecting the sheet to a bath of waterproofing material, dusting both sides of said sheet with a powder, pressing said sheet into shape, cutting said sheet longitudinally into strips, applying an adhesive to the upper surface of said strips, applying sand to said adhesive covered surface, and cutting said strips transversely.

13. The process of making artificial construction material which consists in cutting cornstalks and similar stalks into pieces, reducing said pieces to a pulp with a chemical agent, reducing other fibrous material to a pulp, mixing together the pulp from the two sources, pressing the combined pulp into a sheet, drying said sheet, and subjecting the sheet to a bath of waterproofing material.

14. The process of making artificial construction material which consists in cutting cornstalks and similar stalks into pieces, reducing said pieces to a pulp with a alkali, reducing rags to a pulp with an alkali, mixing together the pulp from the two sources, pressing the combined pulp into a sheet, drying said sheet, subjecting the sheet to a bath of waterproofing material and cutting the sheet.

In testimony whereof I hereunto affix my signature.

MAX SKOLNIK.